United States Patent [19]

Kawakami et al.

[11] Patent Number: 6,106,684
[45] Date of Patent: Aug. 22, 2000

[54] CATIONIC ELECTRODEPOSITION COATING PROCESS AND CATIONIC ELETRODEPOSITION COATING COMPOSITION

[75] Inventors: Ichiro Kawakami, Takatsuki; Hiroyuki Sakamoto, Kobe; Hitoshi Hori, Ibaraki; Takao Saito, Toyonaka; Masahiro Nishio, Kadoma, all of Japan

[73] Assignee: Nippon Paint Co., Ltd., Osaka, Japan

[21] Appl. No.: 09/045,897

[22] Filed: Mar. 23, 1998

Related U.S. Application Data

[63] Continuation of application No. PCT/JP97/02537, Jul. 23, 1997, abandoned.

[30] Foreign Application Priority Data

Jul. 23, 1996 [JP] Japan .................................. 8-213019
Nov. 22, 1996 [JP] Japan .................................. 8-327832

[51] Int. Cl.$^7$ .................................................. C25D 13/00
[52] U.S. Cl. ........................... 204/504; 506/499; 506/489
[58] Field of Search .............................. 204/499, 502, 204/504, 506, 489

[56] References Cited

U.S. PATENT DOCUMENTS 3,959,106  5/1976  Bosso et al. .............................. 204/502
4,225,406  9/1980  Wagener et al. ......................... 204/502
5,034,109  7/1991  Fujibayashi et al. ..................... 24/499

*Primary Examiner*—Kishor Mayekar
*Attorney, Agent, or Firm*—Pollock, Vande Sande & Amernick

[57] ABSTRACT

A cation electrodeposition coating process and cation electrodeposition coating composition that have a sufficient throwing power are provided. A process for cationic electrodeposition coating which comprises the steps of:

(1) immersing a substrate in a cationic electrodeposition coating composition;
(2) applying a voltage between an anode and the substrate, which serves as a cathode, to thereby cause coat film deposition; and
(3) further applying a voltage to the coat film deposited so as to increase electric resistance per unit volume of the coat film, wherein, in step (3), coat films are deposited at those sites of the substrate where coat films have not yet been deposited, the cationic electrodeposition coating composition having a time point when the electric resistance per unit volume of the coat film deposited increases in the course of electrodeposition under constant-current conditions.

9 Claims, 2 Drawing Sheets ic electrodeposition coating composition having a
CATIONIC ELECTRODEPOSITION COATING PROCESS AND CATIONIC ELETRODEPOSITION COATING COMPOSITION This is a continuation of internal application PCT/JP97/02537, filed Jul. 23, 1997, which designates the United States and is now abandoned.

TECHNICAL FIELD

The present invention relates to a cationic electrodeposition coating process and a cationic electrodeposition coating composition that are excellent in throwing power.

BACKGROUND ART

Cationic electrodeposition coating is a process by which even substrates complicated in shape or form and details thereof can be successfully coated and by which coating can be conducted automatically and continuously. Therefore, this process has been generally used as a method for providing automotive bodies and like large-sized substrates complicated in shape and form and required to have highly corrosion resistant with an undercoat. As compared with other coating processes, this process is very highly efficient from the paint consumption viewpoint, and hence economical. It has thus come into wide use as an industrial coating process.

Cationic electrodeposition coating is effected by immersing a substrate in a cationic electrodeposition coating composition for said substrate to serve as a cathode, and applying a voltage thereto. In this coating process, paint film deposition is caused by an electrochemical reaction. Upon voltage application, paint emulsion particles migrate to the surface of the substrate and deposit thereon to form a coat film. The coat film deposited shows an insulation performance so that, in the coating process, the electric resistance of the coat film increases proportionally to the increase in film thickness as the thickness of the deposit film on the surface of the substrate increases. As a result, the paint deposition on the relevant site decreases and, instead, paint film deposition begins at a site having no deposit paint film as yet. In this manner, coating with paint emulsion particles proceeds from site to site until completion of the overall coating. In the present specification, such from-site-to-site sequential paint film formation is referred to as throwing power.

Such cationic electrodeposition coating process is generally applied to the undercoating mainly for corrosion resistance. It is therefore necessary that the paint film thickness be not less than a certain specified value in every place even when the substrates have a complex structure. Since, in cationic electrodeposition coating, insulating coat film portions are formed sequentially on the surface of the substrate, as mentioned above, the throwing power is theoretically supposed to be infinite, and uniform coat film formation must be attained in every place of the substrate.

However, the throwing power is not always satisfactory in the prior art cationic electrodeposition processes; uneven film thicknesses tend to result. Thus, for instance, when evaluated for throwing power by the so-called four-sheet box method, the prior art cationic electrodeposition coating compositions tested all failed to show satisfactory throwing power. Even formic acid-neutralized type coating compositions, which are said to show good throwing powers, gave only G/A values around 48%, thus failing to show satisfactory throwing power.

Consequently, uncoated sites remain and it is difficult to form a deposit film with a desired thickness on those sites that are narrow or limited or that are located within a box-shaped structure. A long time is required if coating of details with coat films with a film thickness not less than a specified value is desired. If an increased film thickness is pursued in those parts which the paint can hardly reach, for example small holes and welded portions, the film thickness in those parts that are in contact with a large quantity of paint, for example outside sheets, will become unnecessarily thick, resulting in waste of paint, electric energy and time.

For reducing such waste, it is necessary to increase the throwing power. A presumable cause of reduced throwing power is that ionic groups, hydrated functional groups and the like contained in the paint remain in the coat films formed and serve as charge transfer media, thus reducing the electric resistance of coat films. For realizing high throwing power in cationic electrodeposition coating, it is necessary to eliminate such factor.

However, for making electrodepositable a coating composition for use in cationic electrodeposition coating, it is necessary to design said coating composition to make it water-based and neutralized. As a result, ions are unavoidably contained therein in an amount not lower than a certain level. Therefore, it is difficult to prevent adverse influences of ionic groups remaining in the coat film deposited. Accordingly, the advent of a cationic electrodeposition coating process in which the throwing power is improved and by which coat films can easily be formed in a short time even on parts otherwise hardly coatable, while avoiding unnecessary increases in film thickness on those parts that are readily coatable has been waited for.

SUMMARY OF THE INVENTION

In view of the above-mentioned state of the art, it is a primary object of the present invention to provide a cationic electrodeposition coating process and a cationic electrodeposition coating composition by or with which sufficient throwing powers can be obtained.

As a result of their intensive investigations, the present inventors turned their attention to the electric resistance per unit volume of the coat film depositing on the surface of the substrate with the progress of electrodeposition and found that the throwing power can be markedly increased when the electric resistance per unit volume is increased in the course of electrodeposition. The present invention has now been completed on such findings.

Thus, the cationic electrodeposition coating process according to the present invention comprises the steps of:

(1) immersing a substrate in a cationic electrodeposition coating composition;

(2) applying a voltage between an anode and said substrate, which serves as a cathode, to thereby cause coat film deposition; and (3) further applying a voltage to the coat film deposited so as to increase electric resistance per unit volume of the coat film, wherein, in step (3), coat films are deposited at those sites of the substrate where coat films have not yet been deposited, the cationic electrodeposition coating composition having a time point when the electric resistance per unit volume of the coat film deposited increases in the course of electrodeposition under constant-current conditions.

The present invention also provides a cationic electrodeposition coating composition that contains 10 to 300 millimoles of sulfonium group and 50 to 2,000 millimoles of ethynyl or nitrile group per 100 grams of the solid resins in the composition.

Description of the lettering

Figure 1:
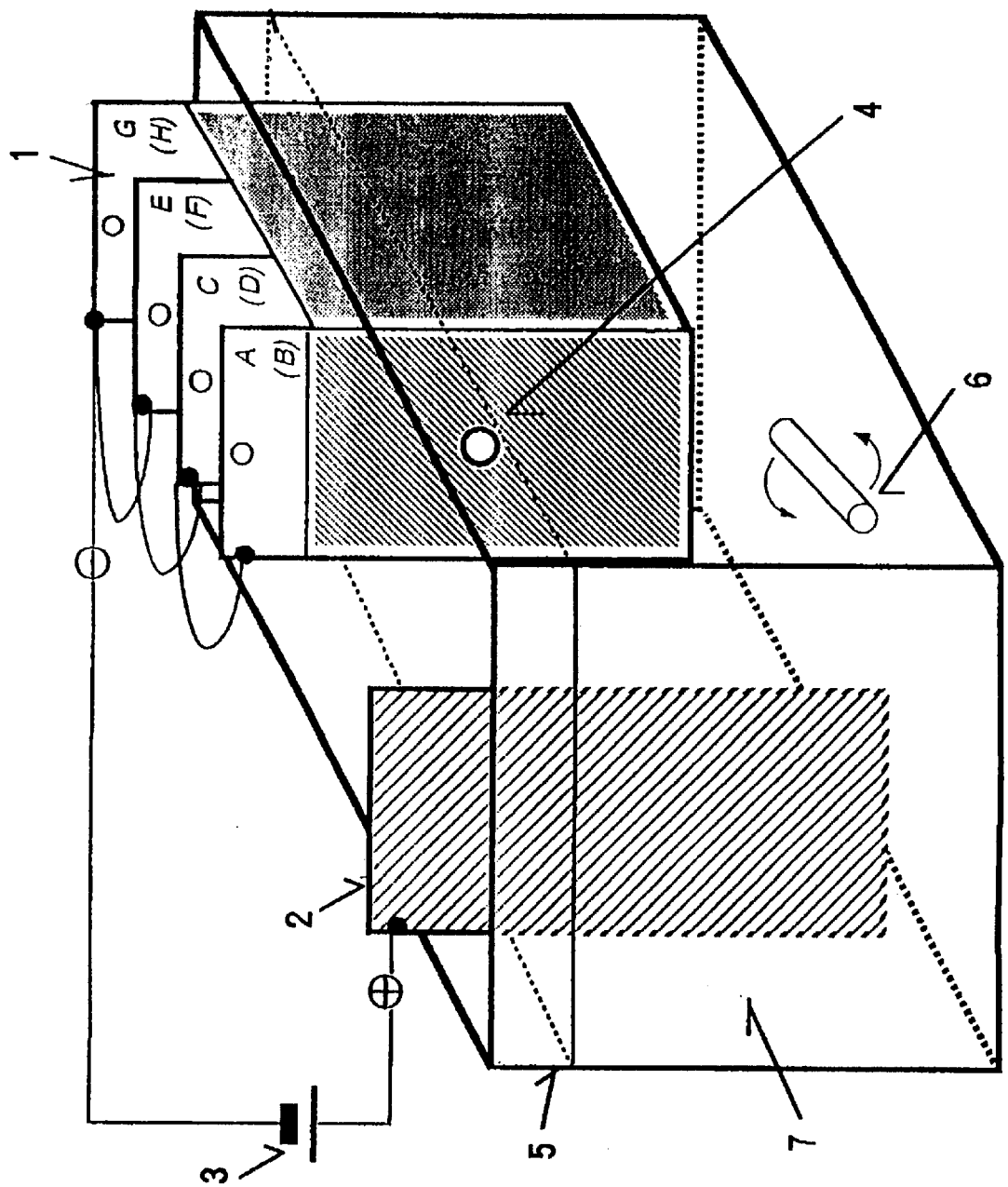
FIG. 1 schematically shows the constitution of a four-sheet box type throwing power measuring apparatus.

1: plates for evaluation [the alphabetic letter indicating the surface to be evaluated and the parentheses indicating the reverse side]
2: a counter electrode
3: direct current
4: through holes
5: an electrodeposition vessel
6: a magnetic stirrer
7: electrodeposition paint.

DETAILED DESCRIPTION OF THE INVENTION

The cationic electrodeposition coating process of the present invention comprises the three steps mentioned above. Step (1) is the step of immersing a substrate in a water-based paint comprising a cationic electrodeposition coating composition.

The substrate may any substrate made of a conductive material. Thus, it includes, but is not limited to, various alloy sheets such as surface-treated steel sheets, untreated steel sheets and galvanized steel sheets, among others. Its shape is not critical. Thus, it may have a simple structure, such as a plane sheet. When applied to substrates having a complicated shape, such as automotive bodies and electric appliances, however, the cationic electrodeposition coating process according to the present invention can produce its effect to the maximum.

The cationic electrodeposition coating composition of the present invention has a time point when the electric resistance per unit volume of the coat film deposited increases in the course of electrodeposition under constant-current conditions.

Figure 2:
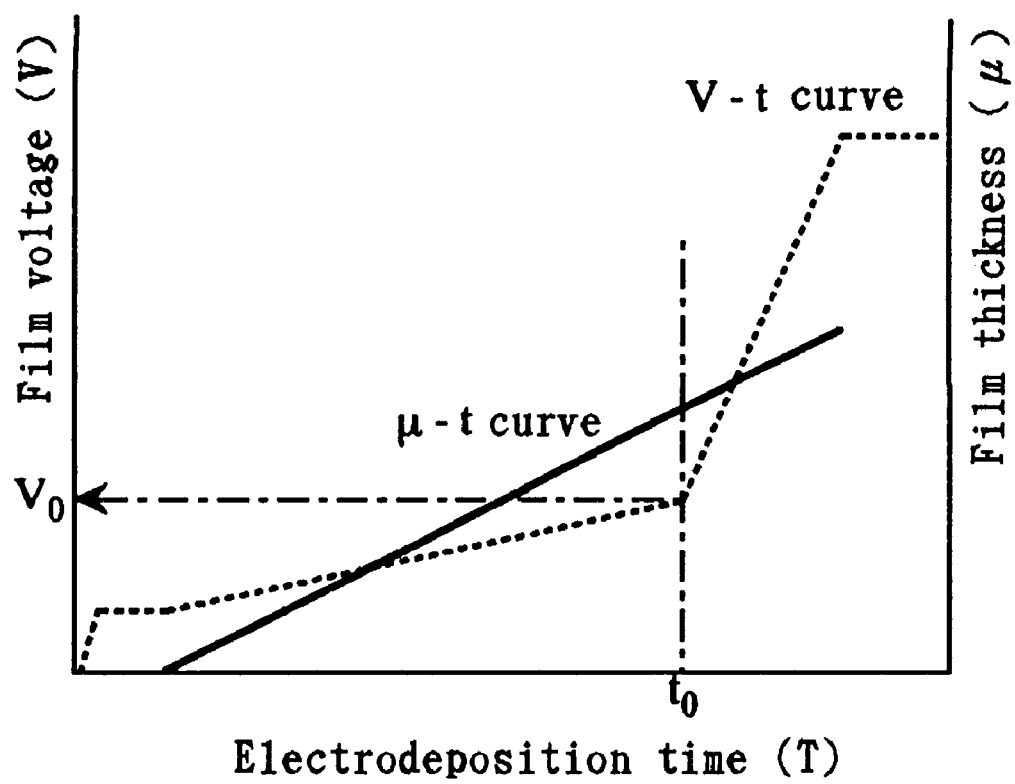
FIG. 2 is a graphic representation of the relationship between electrodeposition time and film potential under constant-current conditions (V-t curve) and of the relationship between electrodeposition time and film thickness ($\mu$-t curve). The solid line curve is the V-t curve and the broken line curve is the $\mu$-t curve.

Thus, by carrying out electrodeposition under constant-current conditions (constant-current method), the cationic electrodeposition coating composition has a time point when the electric resistance per unit volume of the coat film deposited initially remains constant after the start of coat film deposition as resulting from voltage application and later changes. The composition thus possesses a property such that, at that time point, the electric resistance per unit volume of the coat film deposited increases. Such electrodeposition characteristic, when illustrated in terms of the relationship between film potential and electrodeposition time under constant-current conditions, shows a V-t curve as schematically shown in FIG. 2. The V-t curve shows a flexion at time $t_0$ and becomes a straight line arising to the right within a time range around the time $t_0$.

In the course of electrodeposition, the film potential of the coat film increases proportionally to the film thickness when the electric resistance per unit volume of the coat film is constant. In electrodeposition by the constant-current method, the film thickness increases proportionally to time, as shown by the $\mu$-t curve in FIG. 2. Therefore, in the course of electrodeposition, the film potential increases proportionally to time. Thus, when the relationship between film potential and electrodeposition time under constant-current conditions gives such a V-t curve, the electric resistance per unit volume of the deposit coat film changes at around time $t_0$; the electric resistance per unit volume of the deposit coat film after time $t_0$ increases as compared with its value before time $t_0$.

When electrodeposition is carried by the constant-current method, the above-mentioned cationic electrodeposition coating composition to be used in the process of the present invention satisfies such prerequisite, with the V-t curve mentioned above showing an almost constant inclination in time ranges before and after time $t_0$. Said time $t_0$ is the time point when the electric resistances per unit volume of the coat film increases. In the present specification, the time at which the electric resistance per unit volume of the deposit coat film increases is hereinafter referred to as "transition point".

The electric resistance per unit volume of the coat film can be calculated according to the following formula:

$$R_1=(V_1/I)\times S\times(1/\mu_1)$$

where $R_1$ is the electric resistance per unit volume ($\Omega\cdot$cm) at time $t_1$ (sec), $V_1$ is the film potential (V) at time $t_1$ (sec), I is the current (A), S is the area (cm$^2$) of the substrate, and $\mu_1$ is the film thickness (cm) at time $t_1$ (sec). The resistance of the solution is neglected, however.

On the occasion of measurement of the electric resistances per unit volume of the coat film, the current per unit area of an substrate is selected within an appropriate range suited for detecting said transition point. Preferred are 0.5 to 30 mA/cm$^2$. Below 0.5 mA/cm$^2$, a long time may be required until the expression of the transition point and the transition point is not clear. When the current exceeds 30 mA/cm$^2$, the transition point may appear instantaneously, which is not suited for observation. A more preferred range is between 2 and 10 mA/ cm$^2$.

The transition point $t_0$ is not definable generally but a changeable value depending on various factors, such as the current applied, the temperature of the cationic electrodeposition coating composition bath, the kind of the substrate, other physical factors; the concentration of functional groups in the cationic electrodeposition coating composition that is capable of ion releasing upon voltage application, the addition or no addition of an electrolytic reaction promoter, and other chemical factors. More specifically, the value $t_0$ becomes smaller as the current applied increases. The value $t_0$ becomes smaller as the temperature of the cationic electrodeposition coating composition bath falls. As the electric resistance of the substrate increases, the value $t_0$ becomes smaller. As the concentration of functional groups capable of ion releasing upon voltage application (to be explained later in detail) is lowered, the value $t_0$ becomes smaller. In the presence of an electrolytic reaction promoter added, the value $t_0$ is smaller.

When, for instance, an untreated cold-rolled steel sheet is used as the substrate in the practice of the present invention and the constant-current method is employed at a current of 0.5 to 30 mA/cm$^2$, the time until appearance of said transition point is about 20 to 100 seconds.

It is preferred that, for the cationic electrodeposition coating composition to be used in the practice of the present invention, the electric resistance per unit volume of the coat film shows a behavior such that when the electric resistance just before the transition point is compared with the electric resistance after the transition point and just before the occurrence of film rupture, the value just before rupture is not less than twice the value just before the transition point. When the former is less than twice the latter, the throwing power may be insufficient. A more preferred ratio is not less than 5. Generally, the time point just before the rupture can be defined as the time point at which the film potential arrives at a certain value, for example 400 V.

The cationic electrodeposition coating composition preferably contains a component having a functional group capable of ion releasing upon further voltage application to the deposited coat film after coat film deposition on the surface of the substrate.

The functional group capable of ion releasing upon voltage application is not critical but preferably is a hydratable functional group, in particular a sulfonium salt. When a voltage or current not lower than a certain level is applied in the course of electrodeposition coating, the ionic group is lost as a result of the electrolytic reduction reaction shown below, hence can be irreversibly rendered non-conductive.

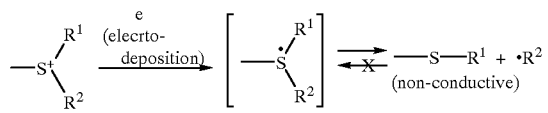

This is an outstanding feature when compared with the reversible ion release by the amino group introduced in conventional cationic electrodeposition coating compositions for rendering them hydratable, as illustrated below. According to the present invention, cationic electrodeposition coating compositions having the above electrodeposition characteristic can suitably be prepared by using a sulfonium salt as the functional group capable of ion releasing upon voltage application.

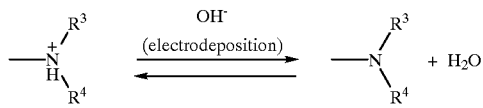

The amount of the functional group capable of ion releasing upon voltage application is preferably in the range of 10 to 300 mmol/100 g of the resin solids in the cationic electrodeposition coating composition. At a level below 10 mmol/100 g, the required throwing power cannot be produced and the bath stability becomes worsened. At a level exceeding 300 mmol/100 g, the coat film deposition on the surface of the substrate will be poor. A more preferred range is 20 to 100 mmol/100 g.

The above cationic electrodeposition coating composition may contain another cationic functional group within limits not impairing the above electrodeposition characteristic. As such, there may be mentioned, for example, an acid-neutralized amino group. In that case, the mole ratio between said acid-neutralized amino group and the functional group capable of ion releasing upon voltage application is preferably 0:100 to 50:50.

When the cationic electrodeposition coating composition contains a component having an unsaturated bond in addition to the functional group capable of ion releasing upon voltage application, a further improved throwing power can be obtained although the reason therefor is unknown. It is thus preferred that the cationic electrodeposition coating composition further contain a component having an unsaturated bond.

Such unsaturated bond can function also as a curable functional group in the cationic electrodeposition coating composition. As used herein, the "unsaturated bond" means a carbon-carbon or carbon-hetero atom double or triple bond. Such unsaturated bond may occur as a pendant-group terminally to the molecule or as a part of the chain. From the availability viewpoint, however, it is preferred that such bond occurs terminally to the molecule. The ethynyl or nitrile group is preferred as such terminal unsaturated bond.

The content of such unsaturated bond is preferably 50 to 2,000 mmol/100 g of the resin solids in the cationic electrodeposition coating composition. At a level below 50 mmol/100 g, the effect of the unsaturated bond on the throwing power is not substantial and the curing becomes insufficient. At a level exceeding 2,000 mmol/100 g, the hydration stability of the coating composition may be adversely affected.

The cationic electrodeposition coating process of the present invention can suitably be carried out using the cationic electrodeposition coating composition of the present invention, which is described in detail in the following.

The cationic electrodeposition coating composition of the present invention contains a base resin. The base resin is not limited to any particular species but preferably is a polyepoxide having at least two glycidyl groups per molecule so that the functional group capable of ion releasing upon voltage application or the unsaturated bond can be readily introduced in the resin skeleton. Said polyepoxide includes, but is not limited to, epibisepoxy resins; chain extension products derived therefrom using a diol, dicarboxylic acid, diamine or the like; epoxidized polybutadiene; novolak phenol type polyepoxy resins; cresol type polyepoxy resins; polyglycidyl acrylate; aliphatic polyol- or polyether polyol-derived polyglycidyl ethers; and polybasic carboxylic acid polyglycidyl esters, among others.

The base resin preferably has a number average molecular weight of 250 to 20,000, more preferably 500 to 5,000.

The method for introducing the functional group capable of ion releasing upon voltage application into the base resin is not limited to any particular one. When the functional group is a sulfonium group, the introduction can be effected, for example, by subjecting a sulfide-acid mixture to reaction with the glycidyl group remaining in the base resin.

The sulfide includes, but is not limited to, aliphatic sulfides, aliphatic-aromatic mixed sulfides, aralkyl sulfides, and cyclic sulfides, among others. More specifically, there may be mentioned diethyl sulfide, dipropyl sulfide, dibutyl sulfide, dihexyl sulfide, diphenyl sulfide, ethyl phenyl sulfide, tetramethylenesulfide, pentamethylenesulfide, thiodiethanol, thiodipropanol, thiodibutanol, 1-(2-hydroxyethylthio)-2-propanol, 1-(2-hydroxyethylthio)-2-butanol and 1-(2-hydroxyethylthio)-3-butoxy-1-propanol, among others.

The acid is not limited to any particular species provided that it can serve as a counter anion to the functional group capable of ion releasing upon voltage application. Thus, it includes, among others, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine, and the like.

The amount of the functional group capable of ion releasing upon voltage application is preferably 10 to 500 mmol/100 g of the base resin solids. At a level below 10 mmol/100 g, poor bath stability may result due to the shortage of the hydratable functional group. At a level exceeding 500 mmol/100 g, the hydratable functional group becomes excessive, worsening the deposition on the surface of the substrate. A more preferred range is 20 to 200 mmol/100 g.

When a sulfonium group is employed as the functional group capable of ion releasing upon voltage application, the use thereof in an amount about half that of conventional acid-neutralized amine can display sufficient hydratability since the hydratability of the sulfonium group per functional group is relatively high; the cationic electrodeposition coating composition obtained has good bath stability.

When the base resin contains an unsaturated bond such as mentioned above, the method for introducing the unsaturated bond is not limited to any particular one. Thus, for example, mention may be made of a method comprising binding, by addition reaction, a triple bond-containing compound such as propargyl alcohol, a nitrile group-containing compound such as ethylene cyanohydrin, or the like to the glycidyl group occurring in the skeleton of the base resin.

It is also possible to react the secondary-alcoholic hydroxyl group formed upon ring opening of the glycidyl group with epichlorohydrin or glycerol-1,3-dichlorohydrin to thereby 3-chloro-2-hydroxypropylate the hydroxyl group, followed by elimination of hydrogen chloride to obtain a glycidyl group again.

In addition to the above, it is further possible to prepare a base resin containing the above unsaturated bond by copolymerizing a monomer containing the unsaturated bond within the molecule, such as a monomer derived from addition of propargyl alcohol to glycidyl methacrylate, or acrylonitrile, with at least one other monomer.

The other monomer may be any one capable of being used in the copolymerization mentioned above. Thus, it includes, but is not limited to, methyl, ethyl, propyl, n-butyl, i-butyl, t-butyl, 2-ethylhexyl, lauryl, phenyl, benzyl, 2-hydroxyethyl, 2-hydroxypropyl, 4-hydroxybutyl and other esters of acrylic or methacrylic acid; Placcel FM series monomers (2-hydroxyethyl methacrylate-caprolactone adducts; products of Daicel Chemical Industries); acrylamide, and derivatives thereof such as N-methylolacrylamide; styrene, α-methylstyrene, vinyl acetate and the like.

Since the base resin itself has curability, no curing agent need be contained in the practice of the present invention. The composition may contain a curing agent as necessary, however. Preferred as such are those containing a plurality of ethynyl or nitrile groups. Curing agents of the blocked isocyanate type may also be used.

As the curing agents containing a plurality of ethynyl or nitrile groups, there may be mentioned those obtainable by subjecting a triple bond-containing compound such as propargyl alcohol, a nitrile group-containing compound or the like to addition reaction with novolak phenol polyepoxide, pentaerythritol tetraglycidyl ether or the like.

The above-mentioned carbon-carbon triple bond polymerization system curing agents and nitrile-nitrile polymerization system curing agents may be in the form of self-emulsifiable emulsions prepared by introducing the above-mentioned functional group capable of ion releasing upon voltage application into the remaining glycidyl group. The method for introducing the functional group capable of ion releasing upon voltage application is not limited to any specific one but may include the methods mentioned above with respect to the base resin. An emulsion prepared by using, as a core, the product of introduction of a triple bond into all glycidyl groups and, as a shell, a compound having both a triple bond and the functional group capable of ion releasing upon voltage application may also be used.

In the curing agent, the content of the unsaturated bond and the content of the functional group capable of ion releasing upon voltage application are preferably adjusted so that they remain within the respective ranges specified hereinabove in relation to the cationic electrodeposition coating composition.

While the above-mentioned curing agents need not be used, the level of addition thereof in cases where they are used is preferably not more than 80% by weight as resin solids in the cationic electrodeposition coating composition.

The cationic electrodeposition coating composition preferably contains a transition metal bound to an organic group as a catalyst for promoting the curing reaction between unsaturated bonds.

The catalyst is not limited to any particular species but includes, among others, those which contain a transition metal, such as nickel, cobalt, copper, manganese, palladium or rhodium, as bound to a ligand such as cyclopentadiene or acetylacetone, or to a carboxylic acid such as acetic acid.

For film thickness control and throwing power improvement, a nucleophilic reagent and/or electromediator may further be added to the above cationic electrodeposition coating composition. These ingredients can promote the electrolytic reaction of the functional group capable of ion releasing upon voltage application.

On the occasion when the functional group capable of ion releasing upon voltage application undergoes electrolytic reduction, the nucleophilic reagent promotes the cleavage of the bond between the hetero atom, which constitutes the functional group capable of ion releasing upon voltage application, and the carbon atom in the resin skeleton. Since the carbon atom in the resin skeleton is biased toward the electronically positive side, a nucleophilic attack on the carbon atom can cause the cleavage. The nucleophilic reagent is therefore not limited to any particular species provided that it has a lone electron pair having nucleophilicity. As specific examples, there may be mentioned amines such as aliphatic amines, alicyclic amines and aromatic amines, among others.

The nucleophilic reagent can be directly added to the cationic electrodeposition coating composition. In the case of conventional neutralized amine type cationic electrodeposition coating compositions, a free amine, when added, deprives the base resin of the neutralizing acid, rendering the electrodeposition bath very unstable. To the contrary, in the case of the cationic electrodeposition coating composition used in the practice of the present invention, such bath stability impairment will not result.

The nucleophilic reagent is added preferably in an amount of 0.3 to 25 meq/100 g of the resin solids in the cationic electrodeposition coating composition. At a level below 0.3 meq/100 g, the increase in electric resistance per unit volume of the coat film as resulting from voltage application at a constant current may become slow, hence a satisfactory effect on the throwing power may not be obtained. At a level exceeding 25 meq/100 g, the effect may be no more proportional to the addition level, hence such a level is uneconomical. A more preferred range is 1 to 15 meq/100 g.

A metal mediator is preferred as the electromediator. As example, there may be mentioned compounds containing tin, cobalt, zinc, bismuth, titanium, chromium, manganese, cadmium or the like. Among them, tin compounds are preferred. More specifically, tin acetate is preferred.

The level of addition of the electromediator is preferably 50 to 5,000 ppm in the cationic electrodeposition coating composition. At a level below 50 ppm, the electromediator may not produce its effect to a satisfactory extent. At a level exceeding 5,000 ppm, the efficiency of coat film deposition may markedly decrease, failing to give a sufficient film thickness. A more preferred range is 100 to 1,000 ppm.

The electromediator is a substance showing a higher reduction potential as compared with the functional group capable of ion releasing upon voltage application and is suited as a promoter of the electrolytic reaction of the functional group. Upon application of a voltage, the electromediator is first reduced and the electromediator reduced reduces the functional group capable of ion releasing upon voltage application, whereupon the ion releasing reaction of the functional group becomes easier to take place.

The above-mentioned cationic electrodeposition coating composition may contain a pigment and a pigment dispersing resin.

The pigment is not limited to any particular species but includes, among others, color pigments such as titanium dioxide, carbon black and iron red oxide; anti-corrosion pigments such as basic lead silicate and aluminum phosphomolybdate; filler pigments such as kaolin, clay and talc; and other pigments commonly used in cationic electrodeposition coating compositions.

In the above cationic electrodeposition coating composition, the level of addition of said pigment is preferably 0 to 50% by weight as solids relative to the cationic electrodeposition coating composition.

The pigment-dispersing resin is not limited to any specific species but includes those in general use. Those containing the above-mentioned functional group capable of ion releasing upon voltage application or the above-mentioned unsaturated bond may also be used. The pigment-dispersing resin containing the functional group capable of ion releasing upon voltage application can be prepared, for example, in the following manner.

A hydrophobic epoxy resin obtained by reacting a bisphenol type epoxy resin with a half-blocked isocyanate is reacted with a sulfide compound to give the desired resin. It is also possible to react a sulfide compound with a modified epoxy resin obtained by reacting a bisphenol type epoxy resin with a half-blocked isocyanate, in the presence of a monobasic acid and a hydroxy-containing dibasic acid to give the desired resin.

Furthermore, conventional additives, such as surfactant, antioxidant, ultraviolet absorber, etc., may be added to the cationic electrodeposition coating composition.

The cationic electrodeposition coating composition of the present invention is prepared by adding the ingredients or additives mentioned above to the base resin as necessary, dispersing the mixture in water and adjusting the nonvolatile matter content in the bath to 15 to 25%. Then it is used in the cationic electrodeposition coating process of the present invention. In that case, it is necessary that the sulfonium and/or ethynyl group content in 100 grams of the resin solids in the cationic electrodeposition coating composition be adjusted within the range mentioned above.

While the characteristic feature of the cationic electrodeposition coating composition mentioned above becomes distinct when it is used in electrodeposition under constant-current conditions, the composition can of course be used in electrodeposition under conditions other than constant-current conditions as well.

In the process of the present invention, step (2) is the step of applying a voltage between the substrate, which serves as a cathode, and an anode, to thereby cause coat film deposition. The voltage to be applied is not critical but generally, it is 50 to 500 V. At below 50 V, electrodeposition will become insufficient. At above 500 V, the electric power consumption becomes uneconomically excessive. By applying a voltage within the above range in the practice of the present invention, the coat film thickness can be controlled with ease and a uniform coat film can be formed all over the substrate submitted to coating, without rapid increases in film thickness in the course of electrodeposition.

The bath temperature of the cationic electrodeposition coating composition on the occasion of applying the voltage mentioned above is preferably 10 to 45° C.

In the process of the present invention, step (3) is the step of further applying a voltage to the coat film deposited as mentioned above, to thereby increase the electric resistance per unit volume of the coat film. The step (3) may be conducted following step (2) in a continuous manner or, after coat film formation in step (2), the voltage application may be once discontinued, followed by applying a voltage again to thereby conduct step (3).

In step (3), a voltage is further applied to the coat film formed in step (2). This voltage to be further applied may be the same or different from that applied in step (2). In cases where voltage application is continued from step (2) to step (3), it is convenient to employ the same voltage. In the process of the present invention, owing to the electrodeposition characteristic of the cationic electrodeposition coating composition which constitutes the coat film, the electric resistance per unit volume of the coat film increases as a result of further voltage application in step (3). It thus becomes possible to markedly improve the insulation performance of the coat film already formed in the process of electrodeposition and it also becomes possible for the coat film to acquire sufficient insulation performance without resulting in an excessive increase in film thickness. At the time point when, at a site of the substrate, an increase is observed in the electric resistance per unit volume of the coat film, the electrodeposition on that site is substantially complete. Immediately thereafter, coat film deposition begins anew at an uncoated site of the substrate. The above process is repeated and, as a result, coat film formation can finally be attained in all parts of the substrate. In this way, the process of the present invention can markedly increase the electric resistance per unit volume of the coat film and remarkably improve the throwing power onto the substrate through the step (3).

In the process of the present invention, the total time required in the above steps (2) and (3) can generally be made 2 to 4 minutes, although it may vary according to the electrodeposition conditions.

After completion of the electrodeposition process, the coat film obtained in the above manner, either as it is or after washing with water, is cured by baking at 100 to 200° C., preferably 140 to 180° C., for 10 to 30 minutes, for completion of the coating process.

In the cationic electrodeposition coating process of the present invention, the thickness of the coat film obtained is preferably 10 to 25 $\mu$m. When it is below 10 $\mu$m, the corrosion resistance may be insufficient. Thicknesses exceeding 25 $\mu$m may result in paint losses. The cationic electrodeposition coating process of the present invention can achieve coat film formation with a substantially uniform film thickness all over the coated surface even when the coat film thickness is small and within the range mentioned above.

The cationic electrodeposition coating process of the present invention, which comprises the above-mentioned steps (1), (2) and (3), can realize successive coat film formation on the surface of the substrate submitted to coating to give a generally uniform coat film with a high level of throwing power. Therefore, not only those parts which come into contact with a large volume of paint in a short time but also details, such as small holes and welded portions can be provided with a coat film having a sufficient film thickness.

In step (2) of the cationic electrodeposition coating process of the present invention, the electric resistance of the substrate remains at a low level, so that spark discharge of hydrogen gas generated on the substrate hardly occurs and zinc gas pinholes are hardly formed.

BEST MODES FOR CARRYING OUT THE INVENTION

The following examples illustrate the present invention in further detail but are by no means limitative of the scope of the invention.

PRODUCTION EXAMPLE 1

Production of a Sulfonium- and Propargyl-containing Epoxy Type Cationic Resin

A flask equipped with stirrer, thermometer, nitrogen inlet tube and reflux condenser was charged with 900.0 g of a bisphenol-based epoxy resin with an epoxy equivalent of 450 (Epikote 1001, product of Yuka Shell Epoxy), 448.0 g of propargyl alcohol and 3.0 g of dimethylbenzylamine. The temperature was then raised to 120° C. and the reaction was allowed to proceed until no more epoxy group was detected in epoxy equivalent determination by hydrochloric acid-dioxane method. Thereafter, unreacted propargyl alcohol was completely distilled off using a vacuum pump. Then, 1,480.0 g of epichlorohydrin and 8.0 g of tetramethylammonium chloride were added, the temperature was raised to 50° C., and 172.0 g of a 50% aqueous solution of sodium hydroxide was added dropwise over 2 hours. The reaction was further allowed to proceed for 5 hours under reduced pressure while continuously removing the byproduct water as an azeotropic mixture with epichlorohydrin. The excess epichlorohydrin was distilled off under reduced pressure, toluene was added to the remaining reaction mixture, and the sodium chloride formed by the reaction was completely removed by phase separation using water and toluene. Thereafter, the toluene was distilled off under reduced pressure, to give a propargyl-containing resin with an epoxy equivalent of 570 (theoretical value: 562). The yield was 88.0%.

A flask equipped with stirrer, thermometer, nitrogen inlet tube and reflux condenser was charged with 1,140 g of the above resin, 272.0 g of 1-(2-hydroxyethylthio)-2-propanol, 360.0 g of a 50% aqueous solution of lactic acid and 108.0 g of deionized water, the temperature was raised to 75° C. and the reaction was allowed to proceed for 6 hours.

After it was confirmed that the acid value was 5 or less, 137.2 g of deionized water was added to give a desired resin solution. The solid matter concentration was 70.2% by weight and the sulfonium value was 71 mmol/100 g.

PRODUCTION EXAMPLE 2

Production of a Sulfonium- and Propargyl-containing Epoxy Type Cationic Resin

A flask equipped with stirrer, thermometer, nitrogen inlet tube and reflux condenser was charged with 1,663.5 g of a cresol novolak-based epoxy resin with an epoxy equivalent of 200.4 (Epo Tohto YDCN-701, product of Tohto Kasei), 510.5 g of propargyl alcohol and 5.0 g of dimethylbenzylamine. The temperature was raised to 125° C. and the reaction was allowed to proceed for 3 hours to give a propargyl-containing epoxy resin with an epoxy equivalent of 1,580.

A flask equipped with stirrer, thermometer, nitrogen inlet tube and reflux condenser was charged with 1,089.5 g of the above resin, 99.0 g of 1-(2-hydroxyethylthio)-2,3-propanediol, 39.0 g of glacial acetic acid and 93.5 g of deionized water. The temperature was raised to 75° C. and the reaction was allowed to proceed for 6 hours. After it was confirmed that the acid value was 5 or less, 289.0 g of deionized water was added, to give a desired resin solution. The solid matter concentration was 70.0% by weight and the sulfonium value was 30 mmol/100 g.

PRODUCTION EXAMPLE 3

Production of a Sulfonium- and Nitrile-containing Polybutadiene Type Cationic Resin A flask equipped with stirrer, thermometer, nitrogen inlet tube and reflux condenser was charged with 1,000.0 g of epoxidized polybutadiene with an epoxy equivalent of 200 (Nisseki Polybutadiene E-1000-8, product of Nippon Petrochemicals) and 204.0 g of cyanoacetic acid. The temperature was raised to 135° C. and the reaction was allowed to proceed for 3 hours. After it was confirmed that the acid value was 0, the mixture was cooled to 75° C., 219.6 g of thiodiethanol, 82.8 g of formic acid and 259.2 g of deionized water were added, and the reaction was carried out for 8 hours. After it was confirmed that the acid value was 5 or less, 268.1 g of deionized water was added to give a desired resin solution. The solid matter concentration was 69.7% by weight and the sulfonium value was 57 mmol/100 g.

PRODUCTION EXAMPLE 4

Production of a Sulfonium- and Nitrile-containing Acrylic Cationic Resin

A flask equipped with stirrer, thermometer, nitrogen inlet tube and reflux condenser was charged with 400.0 g of isopropyl alcohol, and the contents were warmed to 80° C. Then, a mixture, prepared in advance, of 95.0 g of acrylonitrile, 160.0 g of ethyl acrylate, 327.2 g of methyl methacrylate, 175.0 g of n-butyl acrylate, 213.0 g of glycidyl methacrylate, and 25.0 g of the polymerization initiator azobisisobutyronitrile, was added dropwise over 3 hours. After completion of the dropping, the mixture was maintained at 80° C. for 30 minutes and then a solution of 5.0 g of azobisisobutyronitrile in 142.0 g of isopropyl alcohol was added dropwise over 30 minutes. Thereafter, the system was aged for 1.5 hours while maintaining it at 80° C. To the thus-obtained resin were added 204.0 g of 1-(2-hydroxyethylthio)-2-propanol, 270.0 g of a 50% aqueous solution of lactic acid and 81.0 g of deionized water, and the reaction was conducted at 75° C. for 6 hours. After it was confirmed that the acid value was 5 or less, there was obtained a desired resin solution. The solid matter concentration was 57.4% by weight and the sulfonium value was 62 mmol/100 g.

PRODUCTION EXAMPLE 5

Production of a Nitrile-containing aliphatic curing agent

A flask equipped with stirrer, thermometer, nitrogen inlet tube and reflux condenser was charged with 655.0 g of pentaerythritol tetraglycidyl ether with an epoxy equivalent of 213 (Denacol EX411N, product of Nagase Chemicals), 510.0 g of cyanoacetic acid and 1.0 g of dimethylbenzylamine. The temperature was raised to 130° C. and the reaction was allowed to proceed until disappearance of the epoxy group as confirmed by epoxy equivalent determination by hydrochloric acid-dioxane method, to give a desired resin solution. The solid matter concentration was 95.9% by weight.

PRODUCTION EXAMPLE 6

Production of a Propargyl-containing Aromatic Curing Agent

A flask equipped with stirrer, thermometer, nitrogen inlet tube and reflux condenser was charged with 1,663.3 g of a cresol novolak-based epoxy resin with an epoxy equivalent of 200.4 (Epo-Tohto YDCN-701, product of Tohto Kasei), 698.4 g of propargyl alcohol and 5.0 g of dimethylbenzylamine. The temperature was raised to 130° C. and the reaction was allowed to proceed until disappearance of the epoxy group as confirmed by epoxy equivalent determination by hydrochloric acid-dioxane method. Thereafter, the reaction mixture was cooled to 120° C., and 471.8 g of ethylene glycol monobutyl ether was added to give a desired resin. The solid matter concentration was 75.0% by weight.

EXAMPLE 1

The sulfonium- and propargyl-containing epoxy type cationic resin obtained in Production Example 1 (742.8 g), 280 g of the nitrile-containing aliphatic curing agent obtained in Production Example 5, 120.1 g of deionized water and 4.0 g of palladium acetylacetonate were mixed up by stirring with a high-speed rotary mixer for 1 hour, followed by addition of 2,857.1 g of deionized water to adjust the solid matter concentration to 20% by weight. The thus-obtained aqueous solution was used as an electrodeposition paint.

EXAMPLE 2

The sulfonium- and propargyl-containing epoxy type cationic resin obtained in Production Example 2 (1,142.9 g) and 8.0 g of nickel acetylacetonate were mixed up with a high-speed rotary mixer for 1 hour, followed by addition of 2,857.1 g of deionized water to adjust the solid matter concentration to 20% by weight. To the resulting aqueous solution was added 45.0 g of a 10% aqueous solution of N-methylethanolamine with stirring to give an electrodeposition paint.

EXAMPLE 3

The sulfonium- and nitrile-containing polybutadiene-based cationic resin obtained in Production Example 3 (742.8 g), 373.3 g of the propargyl-containing aromatic curing agent obtained in Production Example 6, 26.8 g of deionized water and 4.0 g of palladium acetylacetonate were mixed by stirring with a high-speed rotary mixer for 1 hour. Then, 2,857.1 g of deionized water was added to adjust the solid matter concentration to 20% by weight, followed by further addition, to the resulting aqueous solution, of 22.6 g of a 10% aqueous solution of tin acetate with stirring to give an electrodeposition paint.

EXAMPLE 4

The sulfonium- and nitrile-containing acrylic cationic resin obtained in Production Example 4 (905.9 g), 373.3 g of the propargyl-containing aromatic curing agent obtained in Production Example 6 and 8.0 g of nickel acetylacetonate were mixed up by stirring with a high-speed rotary mixer for 1 hour, followed by addition of 2,720.8 g of deionized water to adjust the solid matter concentration to 20% by weight. To the resulting aqueous solution was further added 53.4 g of a 10% aqueous solution of dimethylethanolamine with stirring to give an electrodeposition paint.

Measurement of the electric resistance of the coat film

Cold-rolled untreated steel sheets were used as evaluation sheets and immersed in one of the electrodeposition paints obtained in Examples 1 to 4. An electric current of 5.0 mA/cm$^2$ was allowed to flow between the counter electrodes. For each paint, the electric resistance value just before the relevant evaluation sheet showed a point of change in film potential (transition point) and the electric resistance value at the time point when the film potential arrived at 400 V were calculated from the respective film potential and film thickness data and the extent of increase in electric resistance was evaluated. The results thus obtained are shown in Table 1.

Measurement of the throwing power

The measurement apparatus shown in FIG. 1 was used to evaluate the four-sheet box throwing power. Four liters of one of the electrodeposition paints prepared in Examples 1 to 4 was placed in a plastic-made electrodeposition coating vessel (100×250×200 mm) and stirred with a magnetic stirrer. Four zinc phosphated steel sheets (JIS G 3141 SPCC-SD, treated with Surfdyne SD-5000) were used as evaluation sheets and arranged at an interval of 20 mm, with the three from the direction of the counter electrode each having a hole with a diameter of 8 mm and allowing penetration of the paint only therethrough, to give a box-like structure, which was then placed in the above electrodeposition coating vessel with a distance of 150 mm from the counter electrode. The lateral sides of the evaluation sheets of the box structure were treated for electric insulation so that no coat film could be formed on said lateral sides. Coating was carried out by applying a voltage between the evaluation sheets (cathodes) and the counter electrode, wherein the voltage was raised up to 300 V in 5 seconds from the start of voltage application and then maintained at 300 V for 175 seconds while controlling the bath temperature at 28° C. The thus-coated evaluation sheets were washed with water and baked at 180° C. for 20 minutes. After air cooling, the film thickness on surface A, which was the nearest to the counter electrode, and the film thickness on surface G, which was the remotest from the counter electrode, were measured and the throwing power was evaluated in terms of G surface/A surface film thickness ratio (G/A value). The results thus obtained are shown in Table 1.

TABLE I

|  | Example 1 | Example 2 | Example 3 | Example 4 |
| --- | --- | --- | --- | --- |
| Base resin |  |  |  |  |
| Production Example | 1 | 2 | 3 | 4 |
| Skeleton | Epibisepoxy | Novolak epoxy | Epoxidized polybutadiene | Acrylepoxy |

TABLE I-continued

|  | Example 1 | Example 2 | Example 3 | Example 4 |
|---|---|---|---|---|
| Unsaturated bond source | Proparagyl alcohol | Proparagyl alcohol | Cyanoacetic acid | Acrylonitrile |
| Hydratable functional group source | 1-(2-Hydroxyethyl thio)-2-propanol | 1-(2-Hydroxyethyl-thio)-2,3-propandiol | Thiodiethanol | 1-(2-Hydroxyethyl-thio)-2-propanol |
| Acid species | Lactic acid | Acetic acid | Formic acid | Lactic acid |
| Unsaturated bond content (mmol/100 g resin solid) | 142 | 315 | 169 | 149 |
| Hydratable functional group content (mmol/100 g resin solid) | 71 | 30 | 57 | 62 |
| Curing agent |  |  |  |  |
| Production Example | 5 | — | 6 | 6 |
| Skeleton | Pentaerythritol tetraglycidyl ether | — | Novolak epoxy | Novolak epoxy |
| Unsaturated bond source | Cyanoacetic acid | — | Proparagyl alcohol | Proparagyl alcohol |
| Unsaturated bond content (mmol/100 g resin solid) | 316 | — | 391 | 391 |
| Emulsion/paint |  |  |  |  |
| Base resin/curing agent (solids wt. ratio) | 65/35 | — | 65/35 | 65/35 |
| Unsaturated bond molar ratio | 92/111 | — | 110/137 | 97/137 |
| Total unsaturated bond (mmol/100 g paint solid) | 203 | 315 | 247 | 234 |
| Total hydratable functional content (mmol/100 g paint solid) | 46 | 30 | 37 | 40 |
| Electrolytic promoter | — | N-methylethanol-amine | Tin acetate | Dimethylethanol-amine |
| Evaluation results |  |  |  |  |
| Electric resistance rise (times) | 3.5 | 5.6 | 5.2 | 4.7 |
| Four-plate box throwing power G/A (%) (G face/A face) | 71.4 (10/14) | 90.5 (19/21) | 84.2 (16/19) | 75.0 (15/20) |

COMPARATIVE EXAMPLE 1

A flask equipped with stirrer, thermometer, nitrogen inlet tube and reflux condenser was charged with 1,900.0 g of a bisphenol-based epoxy resin with an epoxy equivalent of 950 (Epikote 1004, product of Yuka Shell Epoxy) obtained by reacting bisphenol A with epichlorohydrin in the presence of an alkali catalyst. The charge was dissolved in 993 g of ethylene glycol monobutyl ether. Then, 210 g of diethanolamine was added dropwise while maintaining the system at 90° C. After completion of the dropping, the temperature was raised to 110° C. and the reaction was allowed to proceed for 1.5 hours, to give a resin solution with a resin solids content of 68%.

Then, a curing agent derived from diphenylmethanediisocyanate by blocking with ethylene glycol mono-2-ethylhexyl ether and the above resin solution were mixed together in a solids weight ratio of (resin solution)/(curing agent)=75/25, followed by incorporation of 3% by weight of dibutyltin oxide. A 1,383 g portion of this resin composition (solids content 75%) was added to an aqueous solution, prepared in advance, of 21 g of acetic acid in 672 g of deionized water. After stirring with a high-speed mixer for 1 hour, 4,844 g of deionized water was further added to adjust the solid matter concentration to 15% by weight. The resulting aqueous solution was used as an electrodeposition paint.

The electric resistance of the coat film was monitored by the constant-current method in the same manner as in Examples 1 to 4. No increasing change in electric resistance per unit volume of the coat film was noted. Evaluation of the four-sheet box throwing power gave a G/A value of 36.8% (14/38).

COMPARATIVE EXAMPLE 2

A flask equipped with stirrer, thermometer, nitrogen inlet tube and reflux condenser was charged with 1,663.5 g of a cresol novolak-based epoxy resin with an epoxy equivalent of 200.4 (Epo-Tohto YDCN-701, product of Tohto Kasei), 457.8 g of propargyl alcohol and 5.0 g of dimethylbenzylamine. The temperature was raised to 125° C. and the reaction was allowed to proceed for 4 hours. After it was confirmed that the epoxy equivalent had reached 1,360, 459.7 g of ethylene glycol monobutyl ether was added. After cooling to 90° C., or below, 112.7 g of N-methylethanolamine was added and the reaction was conducted at 120° C. for 1.5 hours to give a resin solution with a resin solids content of 80%.

Then, a 1,000.0 g portion of this resin solution was added to an aqueous solution, prepared in advance, of 25.0 g of lactic acid in 574.6 g of deionized water, followed by addition of 8.0 g of nickel acetylacetonate. After one hour of stirring with a high-speed mixer, 2,400.0 g of deionized water was further added to adjust the solid matter concentration to 20% by weight. The resulting aqueous solution was used as an electrodeposition paint.

The electric resistance of the coat film was monitored by the constant-current method in the same manner as in Examples 1 to 4. No increasing change in electric resistance per unit volume of the coat film was noted. Evaluation of the four-sheet box throwing power gave a G/A value of 40.6% (13/32).

EFFECTS OF THE INVENTION

The cationic electrodeposition coating process of the present invention, which has the constitution mentioned above, produces a very high throwing power and can form a satisfactory coat film even on details of a substrate having a very complex structure, hence can form a generally uniform coat film. The external sheets of a substrate can be coated without unnecessarily increasing the film thickness, hence a reduction in the cost of cationic electrodeposition coating can be realized.

We claim:

1. A cationic electrodeposition coating process which comprises the steps of:
   (1) immersing a substrate in a cationic electrodeposition coating composition;
   (2) applying a voltage between an anode and said substrate, which serves as a cathode, to thereby cause coat film deposition; and
   (3) further applying a voltage to the coat film deposited to increase electric resistance per unit volume of said coat film to a level of not less than two-fold,
   wherein, in said step (3), coat films are deposited at those sites of the substrate where coat films have not yet been deposited, said cationic electrodeposition coating composition, when deposited, having a time point when the electric resistance per unit volume of the coat film deposited increase in the course of electrodeposition under constant-current conditions.

2. The cationic electrodeposition coating process according to claim 1, wherein the increase in electric resistance per unit volume of the coat film takes place as a result of irreversible ion release by a hydratable functional group contained in said coat film, which occurs in step (3).

3. The cationic electrodeposition coating process according to claim 2, wherein the hydratable functional group is sulfonium salt.

4. The cationic electrodeposition coating process according to claim 3, wherein the cationic electrodeposition coating composition contains a component having an unsaturated bond.

5. The cationic electrodeposition coating process according to claim 2, wherein the cationic electrodeposition coating composition contains a component having an unsaturated bond.

6. The cationic electrodeposition coating process according to claim 1, wherein the cationic electrodeposition coating composition contains a component having an unsaturated bond.

7. The cationic electrodeposition coating process according to claim 6, wherein the unsaturated bond is ethynyl or nitrile group.

8. The cationic electrodeposition coating process according to claim 1, wherein, in the step (3), electric resistance per unit volume of the coat film is increased to a level of at least 3.5-fold.

9. The cationic electrodeposition coating process according to claim 1, wherein, in the step (3), electric resistance per unit volume of the coat film is increased to a level of not less than 5-fold.

* * * * *